US011175458B2

United States Patent
Ota et al.

(10) Patent No.: US 11,175,458 B2
(45) Date of Patent: Nov. 16, 2021

(54) MULTI-FIBER CONNECTOR FIBER-OPTIC MEASUREMENT DEVICE AND METHOD

(71) Applicants: YOKOGAWA ELECTRIC CORPORATION, Tokyo (JP); Yokogawa Test & Measurement Corporation, Tokyo (JP)

(72) Inventors: Katsushi Ota, Tokyo (JP); Toshikazu Yamamoto, Tokyo (JP)

(73) Assignees: YOKOGAWA ELECTRIC CORPORATION, Tokyo (JP); Yokogawa Test & Measurement Corporation, Tokyo (JP)

( * ) Notice: Subject to any disclaimer, the term of this patent is extended or adjusted under 35 U.S.C. 154(b) by 0 days.

(21) Appl. No.: 16/886,172

(22) Filed: May 28, 2020

(65) Prior Publication Data

US 2020/0379177 A1 Dec. 3, 2020

(30) Foreign Application Priority Data

Jun. 3, 2019 (JP) .............................. JP2019-103854

(51) Int. Cl.
*G02B 6/38* (2006.01)
*G02B 6/27* (2006.01)
*G02B 6/12* (2006.01)

(52) U.S. Cl.
CPC ......... *G02B 6/2706* (2013.01); *G02B 6/2773* (2013.01); *G02B 6/3895* (2013.01); *G02B 2006/12138* (2013.01)

(58) Field of Classification Search
CPC .................................................. G02B 6/3895
See application file for complete search history.

(56) References Cited

U.S. PATENT DOCUMENTS

| | | | | |
|---|---|---|---|---|
| 6,302,590 B1 * | 10/2001 | Moore | ................ | G02B 6/4231 385/53 |
| 8,692,984 B2 * | 4/2014 | Schell | .................... | G01M 11/33 356/73.1 |
| 2018/0340861 A1 * | 11/2018 | Schell | ................. | G01M 11/335 |

FOREIGN PATENT DOCUMENTS

| | | | |
|---|---|---|---|
| JP | H2-234043 A | | 9/1990 |
| JP | 2019152627 A | * | 9/2019 |

* cited by examiner

*Primary Examiner* — Charlie Y Peng
(74) *Attorney, Agent, or Firm* — Osha Bergman Watanabe & Burton LLP

(57) ABSTRACT

A multi-fiber connector fiber-optic measurement device identifies a polarity type and measures an optical power of a multi-fiber connector fiber-optic patch cord. The device includes: a beam splitter that splits light from the multi-fiber connector fiber-optic patch cord into a plurality of lights; a first optical sensor that receives one of the lights split by the beam splitter and outputs a first signal according to the received light; a second optical sensor that receives another of the lights split by the beam splitter and outputs a second signal according to the received light; and a signal processor that calculates the optical power based on the first signal and identifies the polarity type based on the second signal.

8 Claims, 13 Drawing Sheets

A-type 12-core MPO connector

B-type 12-core MPO connector

MULTI-FIBER CONNECTOR FIBER-OPTIC MEASUREMENT DEVICE AND METHOD

BACKGROUND

Technical Field

The present invention generally relates to a multi-fiber connector fiber-optic measurement device and method.

Related Art

Conventionally, optical communication systems of performing data communication and the like by optical signals are in practical use. Optical communication systems use optical fibers as a medium for transmitting optical signals. As facilities that utilize an optical communication system, there are, for example, data centers that are operated by being installed with computers and data communication devices. In facilities such as data centers, a large quantity of optical fibers is laid to mutually connect each device.

In recent years, facilities such as data centers are facing a demand for increased data transmission quantities. As such, facilities such as data centers are attempting to increase a density of data transmission by laying multi-fiber optic patch cords, which have multi-fiber optical connectors installed to both ends of multi-fiber optical fibers, these being made multi-fiber by bundling a plurality of optical fibers.

Now, among multi-fiber connector fiber-optic patch cords, there is a plurality of types with different polarities depending on how each optical fiber is connected between the multi-fiber optical connectors at both ends. For example, among 12-fiber MPO (multi-fiber push-on) connectors, there are three polarity types—an A type, a B type, and a C type—depending on how the optical fibers are connected between the MPO connectors. As such, when laying multi-fiber connector fiber-optic patch cords in a facility such as a data center, these need to be laid with an awareness of a polarity type of the multi-fiber connector fiber-optic patch cords. Moreover, when laying multi-fiber connector fiber-optic patch cords in a facility such as a data center, to measure connection loss in connected multi-fiber connector fiber-optic patch cords, an optical power of transmitted light is also measured. Conventionally, a polarity type and an optical power of a multi-fiber optic patch cord are identified and measured using, for example, the multi-fiber connector fiber-optic measurement device disclosed in patent literature 1.

Patent Literature

Patent Literature 1: Japanese Patent Application Publication No. H2-234043 A

However, conventional multi-fiber connector fiber-optic measurement devices have decreased measurement precision of optical power of a multi-fiber connector fiber-optic patch cord.

SUMMARY

One or more embodiments of the present invention provide a multi-fiber connector fiber-optic measurement device and method that can suppress decreased measurement precision of optical power of a multi-fiber connector fiber-optic patch cord and identify a polarity type of a multi-fiber connector fiber-optic patch cord.

A multi-fiber connector fiber-optic measurement device according to one or more embodiments identifies a polarity type and measures an optical power of a multi-fiber connector fiber-optic patch cord, provided with a beam splitter that splits light from the multi-fiber connector fiber-optic patch cord, a first optical sensor that receives one light among the light split by the beam splitter and outputs a first signal according to the received light, a second optical sensor that receives the other light among the light split by the beam splitter and outputs a second signal according to the received light, and a signal processing unit (signal processor) that calculates the optical power based on the first signal from the first optical sensor and identifies the polarity type based on the second signal from the second optical sensor.

As a result of this configuration, the polarity type of the multi-fiber connector fiber-optic patch cord can be identified and decreased measurement precision of the optical power of the multi-fiber connector fiber-optic patch cord can be suppressed regardless of a fiber count of the multi-fiber connector fiber-optic patch cord.

In one or more embodiments, the second optical sensor may include a first photodiode for channel identification and a second photodiode for channel identification, and the first photodiode for channel identification and the second photodiode for channel identification may be positioned away from each other on a light-receiving face of the light.

In this manner, with the second optical sensor including the first photodiode for channel identification and the second photodiode for channel identification that are positioned away from each other, channels can be precisely identified.

In one or more embodiments, the first photodiode for channel identification and the second photodiode for channel identification may be positioned shifted in mutually opposing directions along a direction perpendicular to a center axis of the light on the light-receiving face.

In this manner, with the second optical sensor including the first photodiode for channel identification and the second photodiode for channel identification that are positioned shifted in mutually opposing directions, channels can be precisely identified even in, for example, a 12-fiber×two-row 24-fiber MPO connector.

In one or more embodiments, the second optical sensor may further include a third photodiode for channel identification and a fourth photodiode for channel identification, the first photodiode for channel identification and the second photodiode for channel identification may be positioned away from each other along a center axis of the light on the light-receiving face, and the third photodiode for channel identification and the fourth photodiode for channel identification may be positioned away from each other along a direction perpendicular to the center axis on the light-receiving face.

In this manner, with the second optical sensor further including the third photodiode for channel identification and the fourth photodiode for channel identification, channels can be more precisely identified even in, for example, a 12-fiber×two-row 24-fiber MPO connector.

In one or more embodiments, the beam splitter may be a non-polarizing beam splitter.

As a result of this configuration, an absolute value of the optical power can be precisely measured, and optical-power fluctuations between channels can be suppressed.

In one or more embodiments, the one light may be transmitted light, and the other light may be reflected light.

In one or more embodiments, the multi-fiber connector fiber-optic measurement device may be further provided with a condensing lens between the multi-fiber connector fiber-optic patch cord and the beam splitter that condenses all light from the multi-fiber connector fiber-optic patch cord to the first optical sensor.

As a result of this configuration, the optical power can be precisely measured even without using a first optical sensor including a large-diameter photodiode.

In one or more embodiments, the multi-fiber connector fiber-optic measurement device may be a receptacle for a multi-fiber optical connector connected to the multi-fiber connector fiber-optic patch cord via a multi-fiber optical connector, and the receptacle for a multi-fiber optical connector may be provided with an opening portion (opening) that does not block light emitted from a ferrule end face of optical fibers included in the multi-fiber optical connector.

With the receptacle for a multi-fiber optical connector including the opening portion in this manner, the receptacle for a multi-fiber optical connector is compatible with multi-fiber optical connectors of various shapes.

In one or more embodiments, the opening portion may house a positioning pin provided by the multi-fiber optical connector.

With the receptacle for a multi-fiber optical connector including the opening portion in this manner, the receptacle for a multi-fiber optical connector can accept both a male-type and a female-type multi-fiber optical connector.

A method according to one or more embodiments is a multi-fiber connector fiber-optic measurement method of identifying a polarity type and measuring an optical power of a multi-fiber connector fiber-optic patch cord, including a step of a beam splitter splitting light from a multi-fiber connector fiber-optic patch cord, a step of a first optical sensor receiving one light among the light split by the beam splitter and outputting a first signal according to the received light, a step of a second optical sensor receiving the other light among the light split by the beam splitter and outputting a second signal according to the received light, and a step of a signal processing unit calculating the optical power based on the first signal from the first optical sensor and identifying the polarity type based on the second signal from the second optical sensor.

As a result of this configuration, the polarity type of the multi-fiber connector fiber-optic patch cord can be identified and decreased measurement precision of the optical power of the multi-fiber connector fiber-optic patch cord can be suppressed regardless of a fiber count of the multi-fiber connector fiber-optic patch cord.

According to one or more embodiments, decreased measurement precision of optical power of a multi-fiber connector fiber-optic patch cord can be suppressed, and a polarity type of a multi-fiber connector fiber-optic patch cord can be identified.

DETAILED DESCRIPTION OF EMBODIMENTS

Embodiments of the present invention are described below with reference to the drawings. In the diagrams, identical reference signs indicate identical or equivalent components.

First, for comparison, a configuration example of a multi-fiber connector fiber-optic measurement device of a comparative example is described with reference to FIG. 1.

Figure 1:
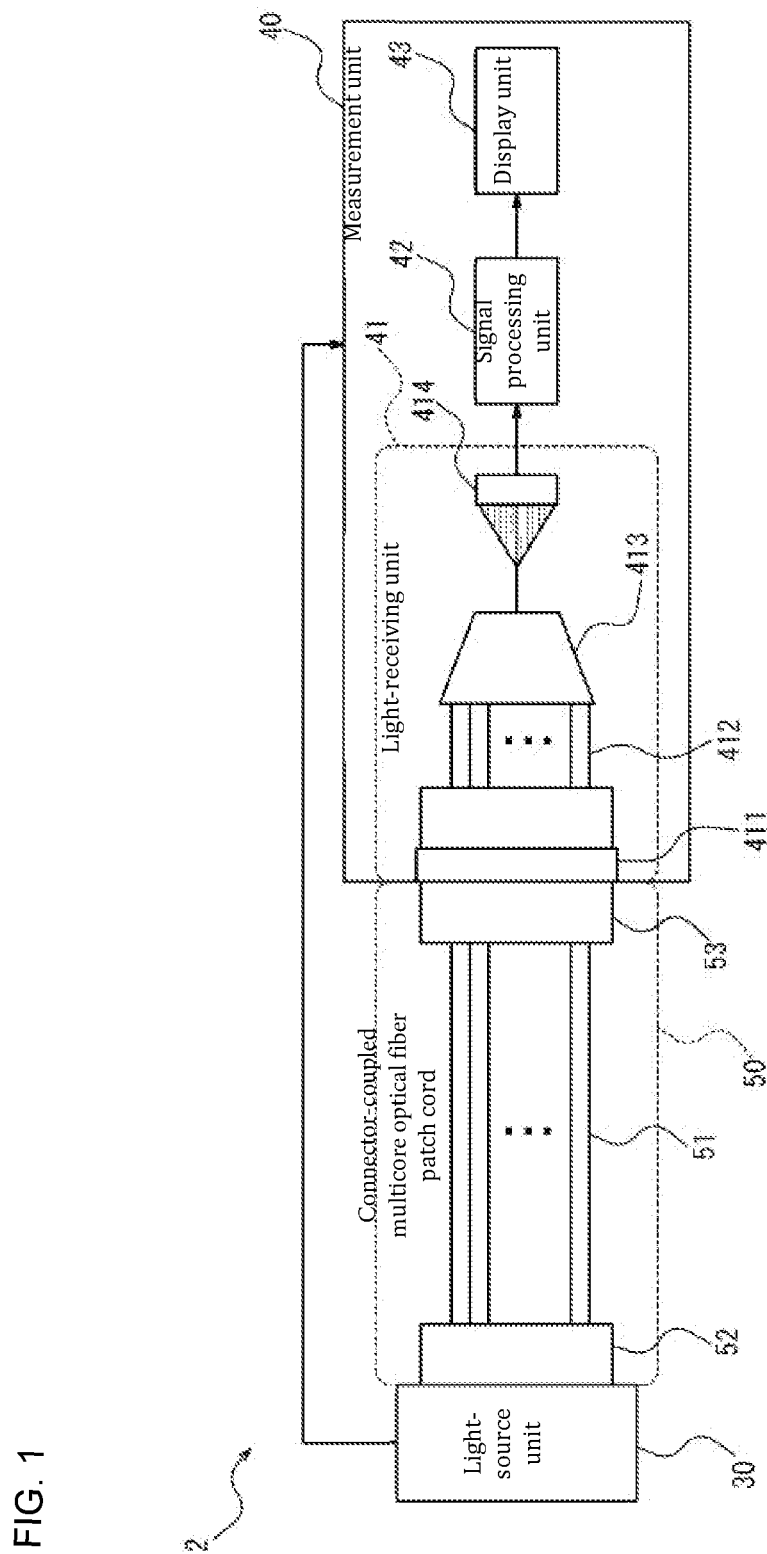
FIG. 1 A functional block diagram illustrating a configuration of a multi-fiber connector fiber-optic measurement device of a comparative example.

FIG. 1 is a functional block diagram illustrating a configuration of a multi-fiber connector fiber-optic measurement device 2 of the comparative example. The multi-fiber connector fiber-optic measurement device 2 is provided with a light-source unit 30 and a measurement unit 40. In the multi-fiber connector fiber-optic measurement device 2, the light-source unit 30 is connected to one end of a multi-fiber connector fiber-optic patch cord 50, and the measurement unit 40 is connected to another end of the multi-fiber connector fiber-optic patch cord 50. The multi-fiber connector fiber-optic measurement device 2 identifies a polarity type and measures an optical power of the multi-fiber connector fiber-optic patch cord.

The light-source unit 30 includes a light source, an optical switch, fiber-optic fanout cords, and a multi-fiber connector adapter. The light-source unit 30 is connected to the one end of the multi-fiber connector fiber-optic patch cord 50 via the multi-fiber connector adapter. Light generated by the light source becomes incident on a channel of any one optical fiber 51 included in the multi-fiber connector fiber-optic patch cord 50 via the optical switch, the fiber-optic fanout cords, and the multi-fiber connector adapter. At this time, the optical switch sequentially switches the fiber-optic fanout cord whereon the light generated by the light source becomes incident so the light sequentially becomes incident on the channel of any one optical fiber.

The measurement unit 40 includes a light-receiving unit 41, a signal processing unit 42, and a display unit 43. The light-receiving unit 41 includes a multi-fiber connector adapter 411, fiber-optic fanout cords 412, an optical switch 413, and an optical sensor 414. The light-receiving unit 41 is connected to an MPO connector 53 provided at the other end of the multi-fiber connector fiber-optic patch cord 50 via the multi-fiber connector adapter 411. The light-receiving unit 41 makes the light transmitted by the channel of any one optical fiber 51 included in the multi-fiber connector fiber-optic patch cord 50 incident on a corresponding fiber-optic fanout cord 412 via the multi-fiber connector adapter 411. The light-receiving unit 41 emits the light incident on the fiber-optic fanout cord 412 to the optical switch 413. The optical switch 413 sequentially switches an optical path of the incident light and sequentially emits the incident light to the optical sensor 414. The optical sensor 414 sequentially outputs a signal according to the received light to the signal processing unit 42. Based on the signal sequentially output from the optical sensor 414, the signal processing unit 42 sequentially calculates an optical power of the light transmitted by the channel of any one optical fiber 51 included in the multi-fiber connector fiber-optic patch cord 50. Moreover, by comparing the calculated optical powers of each channel, the signal processing unit 42 sequentially identifies the channel of any one optical fiber 51 whereon the light from the light source is incident. Then, when optical-power calculation and identification of the channels of all optical fibers 51 are completed, the signal processing unit 42 identifies a polarity type of the multi-fiber connector fiber-optic patch cord 50. The display unit 43 displays the polarity type of the multi-fiber connector fiber-optic patch cord 50 and the optical power of each channel output by the signal processing unit 42.

However, according to the multi-fiber connector fiber-optic measurement device of the comparative example, connection loss arises between the multi-fiber connector fiber-optic patch cord 50 and the fiber-optic fanout cords 412. Moreover, light loss arises due to switching the optical path of the light using the optical switch 413. This causes decreased measurement precision of optical power. Moreover, among MPO connectors, there are connectors that have the same external shape but different optical-fiber positions at a ferrule end face, such as a 12-fiber MPO connector and a 24-fiber MPO connector. However, the multi-fiber connector fiber-optic measurement device of the comparative example cannot be used with both such MPO connectors.

On the other hand, a multi-fiber connector fiber-optic measurement device according to one or more embodiments can, regardless of a fiber count of a multi-fiber connector fiber-optic patch cord, identify a polarity type of the multi-fiber connector fiber-optic patch cord and suppress decreased measurement precision of optical power of the multi-fiber connector fiber-optic patch cord.

Figure 2:
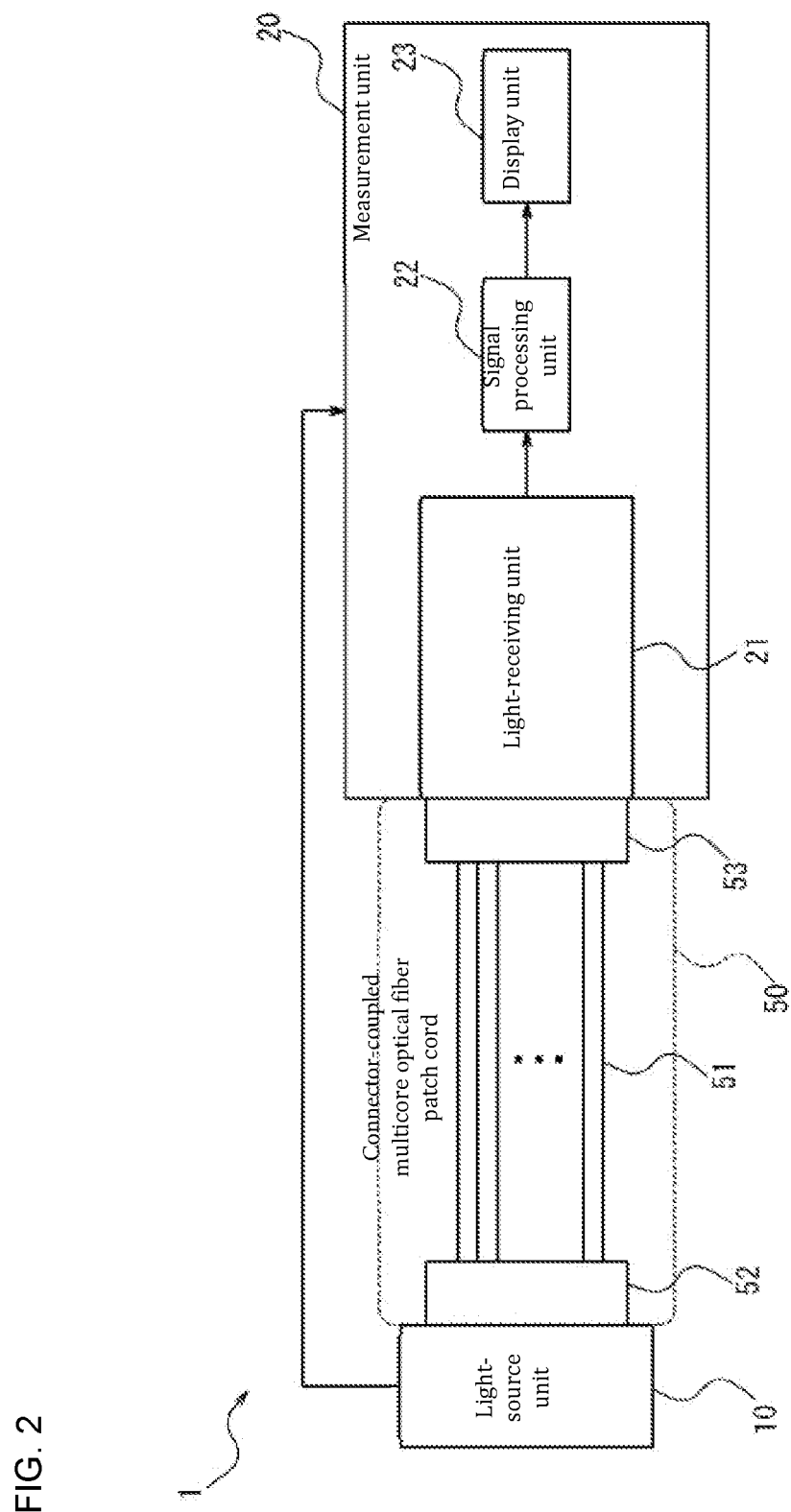
FIG. 2 A functional block diagram illustrating a configuration of a multi-fiber connector fiber-optic measurement device according to one or more embodiments.

A multi-fiber connector fiber-optic measurement device and method according to one or more embodiments are described below. FIG. 2 is a functional block diagram illustrating a configuration of a multi-fiber connector fiber-optic measurement device 1 according to one or more embodiments. The multi-fiber connector fiber-optic measurement device 1 is provided with a light-source unit 10 and a measurement unit 20. The multi-fiber connector fiber-optic measurement device 1 simultaneously identifies a polarity type and measures an optical power of a multi-fiber connector fiber-optic patch cord 50 connected between the light-source unit 10 and the measurement unit 20.

The multi-fiber connector fiber-optic patch cord 50 that is a measurement target is a fiber-optic cable that is imparted with multiple fibers by bundling a plurality of optical fibers 51 and has multi-fiber optical connectors 52, 53 installed to both ends thereof. Hereinbelow, the multi-fiber optical connectors 52, 53 are described as being MPO connectors. As the multi-fiber connector fiber-optic patch cord 50, there is a plurality of types with different polarities depending on how each optical fiber 51 is connected between the MPO connector 52 and the MPO connector 53 (for example, an A type, a B type, and a C type). For example, in an A-type multi-fiber connector fiber-optic patch cord 50, when viewed so the MPO connector 52 and the MPO connector 53 are lined up in the same direction, channel arrangements of the optical fibers at the MPO connectors 52, 53 have the same order. Moreover, in a B-type multi-fiber connector fiber-optic patch cord 50, when viewed so the MPO connector 52 and the MPO connector 53 are lined up in the same direction, channel arrangements of the optical fibers at the MPO connectors 52, 53 are in reverse order. Moreover, in a C-type multi-fiber connector fiber-optic patch cord 50, when viewed so the MPO connector 52 and the MPO connector 53 are lined up in the same direction, channel arrangements of the optical fibers at the MPO connectors 52, 53 are in reverse order every two adjacent channels.

The light-source unit 10 sequentially makes light incident on the channel of each optical fiber 51 included in the multi-fiber connector fiber-optic patch cord 50. As the light-source unit 10, for example, the following two configurations can be mentioned depending on a number of light sources.

Figure 3A:
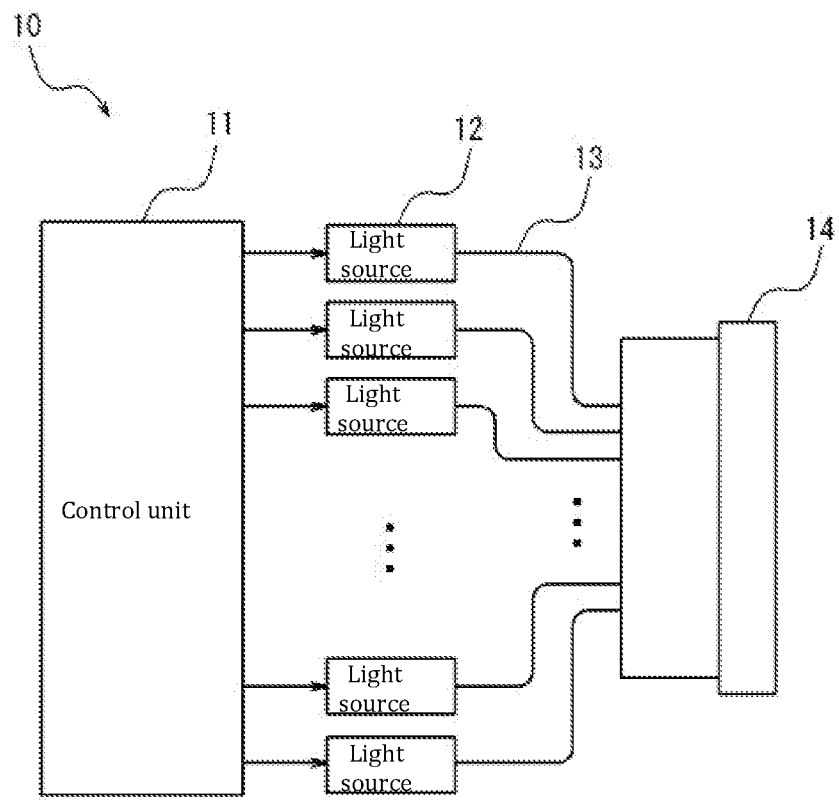
FIG. 3A A functional block diagram illustrating a configuration of the light-source unit in FIG. 2.

In the example illustrated in FIG. 3A, the light-source unit 10 has a control unit 11, a plurality of light sources 12, fiber-optic fanout cords 13, and a connector adapter 14. The control unit 11 causes any one light source 12 corresponding to the channel of an optical fiber 51 included in the multi-fiber connector fiber-optic patch cord 50 to generate light. Moreover, the control unit 11 sequentially switches which light source 12 generates light. Each light source 12 can include, for example, an LED or a laser diode. The light source 12 makes the generated light incident on a corresponding fiber-optic fanout cord 13. The fiber-optic fanout cord 13 transmits the light incident thereon from the light source 12 to the connector adapter 14. The connector adapter 14 is connected (for example, fitted) to the MPO connector 52, which is installed to one end of the multi-fiber connector fiber-optic patch cord 50. This causes the light from the light source 12 to be emitted to the channel of a corresponding optical fiber 51 included in the multi-fiber connector fiber-optic patch cord 50.

Figure 3B:
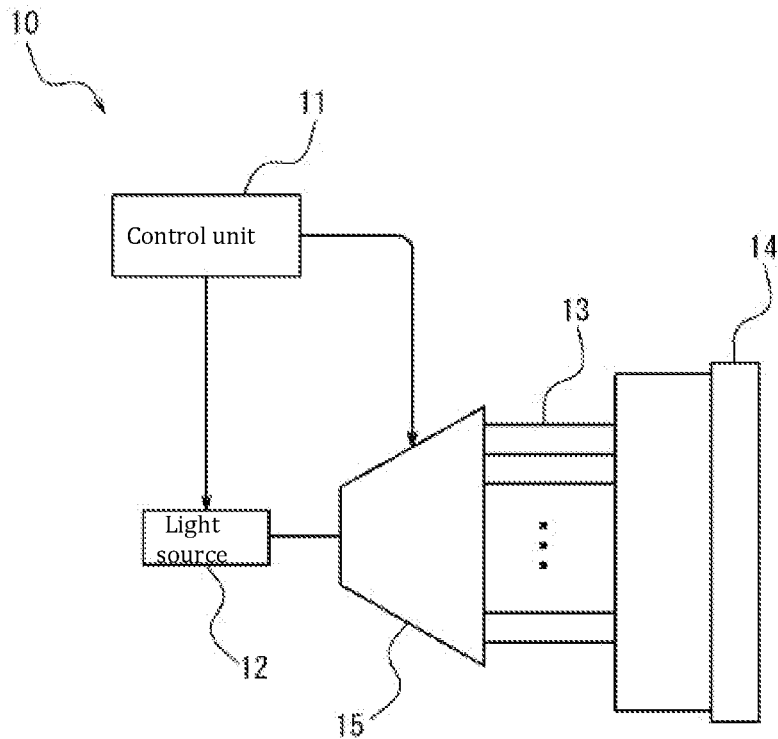
FIG. 3B A functional block diagram illustrating a configuration of the light-source unit in FIG. 2.

In the example illustrated in FIG. 3B, the light-source unit 10 includes a control unit 11, one light source 12, fiber-optic fanout cords 13, a connector adapter 14, and an optical switch 15. The optical switch 15 includes, for example, a prism or a micromirror lens and can change an optical path of the light from the light source 12. The control unit 11 causes the light source 12 to generate light and makes the generated light incident on the optical switch 15. Moreover, the control unit 11 changes the optical path of the light from the light source 12 by the optical switch 15 and emits the light whose optical path is changed to a corresponding fiber-optic fanout cord 13. The fiber-optic fanout cord 13 transmits the light from the optical switch 15 to the connector adapter 14. The connector adapter 14 is connected (for example, fitted) to the multi-fiber optical connector 52 installed to the one end of the multi-fiber connector fiber-optic patch cord 50. This causes the light from the light source 12 to be emitted to the channel of a corresponding optical fiber 51 included in the multi-fiber connector fiber-optic patch cord 50.

By such a configuration, the light-source unit 10 emits the light generated by the light source 12 to any one optical fiber included in the MPO connector 52 connected to the connector adapter 14. However, the configuration of the light-source unit 10 is not limited thereto and can adopt any configuration.

Figure 4:
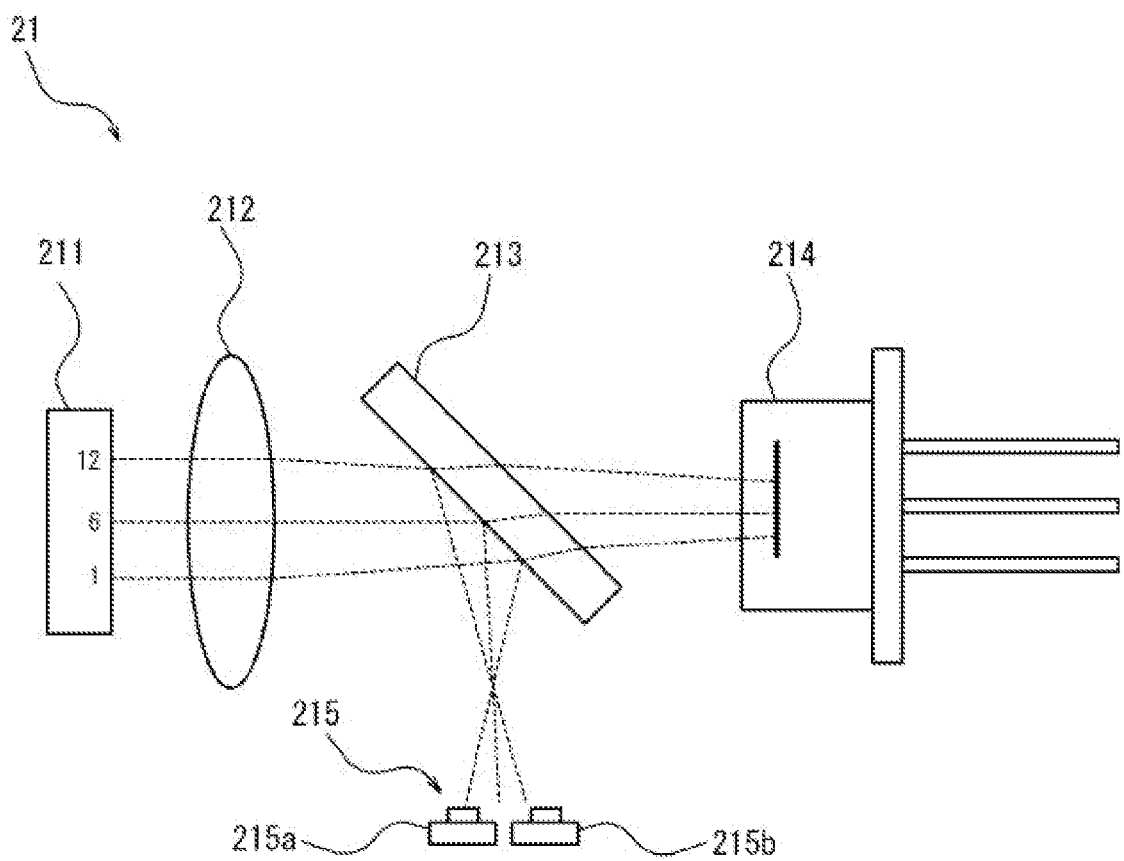
FIG. 4 A functional block diagram illustrating a configuration of the light-receiving unit in FIG. 2.

Referring to FIG. 2, the measurement unit 20 includes a light-receiving unit 21, a signal processing unit 22, and a display unit 23. Moreover, referring to FIG. 4, the light-receiving unit 21 includes a receptacle 211 for a multi-fiber optical connector, a condensing lens 212, a beam splitter 213, a first optical sensor 214, and a second optical sensor 215.

Figure 5A:
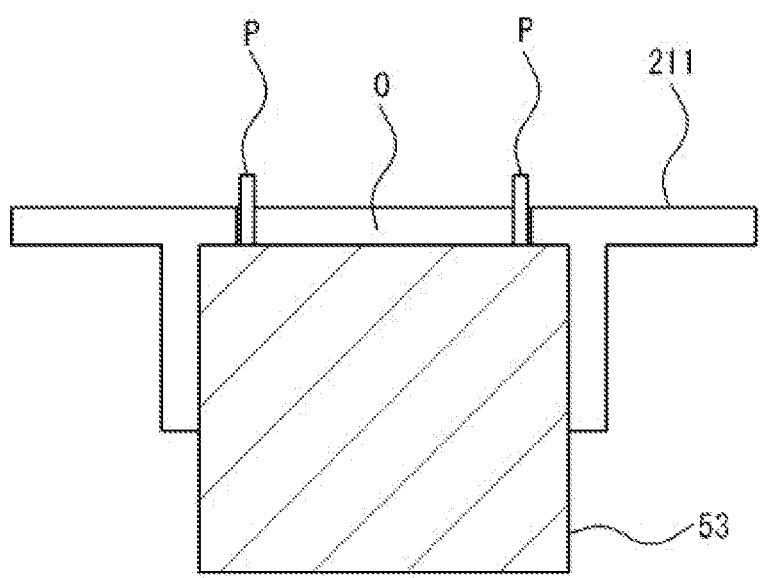
FIG. 5A A schematic view for describing a male-type MPO connector.
Figure 5B:
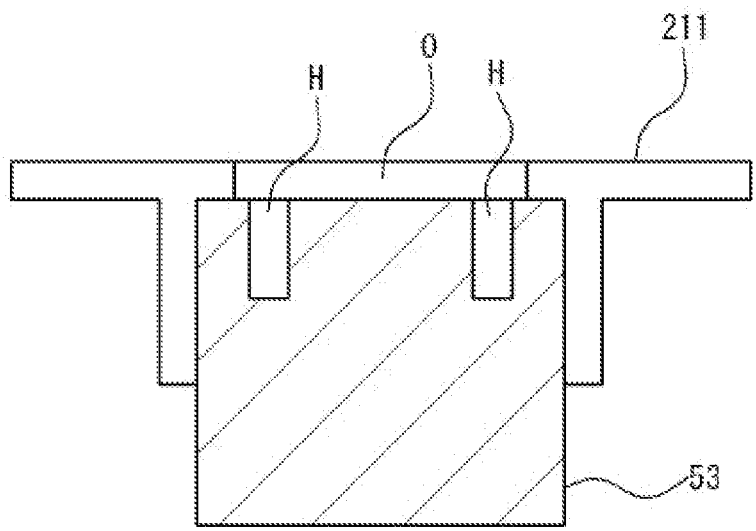
FIG. 5B A schematic view for describing a female-type MPO connector.

The receptacle 211 for a multi-fiber optical connector is, for example, a connector of a receptacle type. Here, the MPO connector 53, which is connected to the receptacle 211 for a multi-fiber optical connector, can have various shapes. For example, the MPO connector 53 may have a paired shape so ferrule end faces of the optical fibers included in the MPO connector oppose each other in correct positions. Specifically, as illustrated in FIG. 5A, an MPO connector 53 of a male type having positioning pins P and, as illustrated in FIG. 5B, an MPO connector 53 of a female type having positioning holes H whereinto the positioning pins P are inserted can be mentioned. The receptacle 211 for a multi-fiber optical connector has a shape that can connect to either type of MPO connector 53. Specifically, the receptacle 211 for a multi-fiber optical connector can have an opening portion O of a size and shape that does not block the light emitted from the ferrule end face of the MPO connector 53. Moreover, the opening portion O can have a size and shape that can house the two positioning pins P had by the male-type MPO connector 53. By this, regardless of the type of the MPO connector 53, states wherein the ferrule end face of the MPO connector 53 is abutted to a ferrule-abutting part of the receptacle 211 for a multi-fiber optical connector are similar states. As appropriate, the receptacle 211 for a multi-fiber optical connector may have a key groove for preventing the MPO connector 53 from being connected in a reverse orientation.

The condensing lens 212 can be positioned between the multi-fiber connector fiber-optic patch cord 50 and the beam splitter 213—for example, between the receptacle 211 for a multi-fiber optical connector and the beam splitter 213. The condensing lens 212 condenses all light from the receptacle 211 for a multi-fiber optical connector to the first optical sensor 214. This enables the optical power to be measured precisely without, for example, increasing a diameter of a photodiode of the first optical sensor 214. No condensing lens 212 needs to be present if a large-diameter photodiode is used.

The beam splitter 213 is positioned between the condensing lens 212 and the first optical sensor 214. The beam splitter 213 splits the light from the receptacle 211 for a multi-fiber optical connector at a predetermined splitting ratio, causing the first optical sensor 214 to receive one light among the split lights and the second optical sensor 215 to receive the other light among the split lights. In one or more embodiments, the light received by the first optical sensor 214 is transmitted light, and the light received by the second optical sensor 215 is reflected light. A non-polarizing beam splitter may be used as the beam splitter 213. This enables an absolute value of the optical power to be precisely measured and enables fluctuations in the optical power between channels to be suppressed. However, if the light from the receptacle 211 for a multi-fiber optical connector is in an unpolarized state, the beam splitter is not limited thereto. Moreover, the beam splitter 213 may be a beam splitter with low polarization dependence so output fluctuations between adjacent channels are small. The splitting ratio of the beam splitter 213 can be made to be, for example, 50:50 but is not limited thereto.

The first optical sensor 214 receives the light from the beam splitter 213 and outputs a first signal according to the received light to the signal processing unit 22. This first signal can include an electrical signal such as a photovoltaic current. The first optical sensor 214 can include a photodiode having a light-receiving region that can receive all the light from the beam splitter 213. A material of the photodiode can be selected as appropriate according to a wavelength of the light, and for example, silicon (Si), indium gallium arsenide (InGaAs), and germanium (Ge) can be mentioned. The first optical sensor 214 can be positioned anywhere as long as a focal point of the light from the beam splitter 213 is not present in the light-receiving region.

The second optical sensor 215 receives the light from the beam splitter 213 and outputs a second signal according to the received light to the signal processing unit 22. This second signal can include an electrical signal such as a photovoltaic current. Specifically, the second optical sensor 215 can include a first photodiode 215a for channel identification and a second photodiode 215b for channel identification. The first photodiode 215a for channel identification and the second photodiode 215b for channel identification are positioned, for example, mutually separated by a predetermined distance along a center axis of the received light. The "center axis of the light" can be found in advance by, for example, an optical simulation. Specifically, referring to FIG. 7A as well, a straight line connecting a center of a circle (illustrated by a dashed line in the diagram) illustrating a region wherein an energy density value of a spatial light L1 from channel 1 is $1/e^2$ of a peak value and a center of a circle (illustrated by a dashed line in the diagram) illustrating a region wherein an energy density value of a spatial light L12 from channel 12 is $1/e^2$ of a peak value can be defined as the "center axis of the light." The "predetermined distance" varies according to channel intervals (a channel pitch) and a numerical aperture of the optical fibers but is a distance within a range of, for example, several millimeters to several millimeters over ten millimeters. A material of the first photodiode 215a for channel identification and the second photodiode 215b for channel identification can be selected as appropriate according to the wavelength of the light, and for example, silicon (Si), indium gallium arsenide (InGaAs), and germanium (Ge) can be mentioned. Moreover, the first photodiode 215a for channel identification and the second photodiode 215b for channel identification may be surface-mounted photodiodes instead of TO-can photodiodes. The second optical sensor 215 can be positioned anywhere as long as a focal point of the light from the beam splitter 213 is not present in a light-receiving region.

The signal processing unit 22 obtains the optical power of the light emitted from a specific channel of the optical fibers based on the first signal output from the first optical sensor 214. For example, the signal processing unit 22 converts into a voltage signal and amplifies the electrical signal such as the photovoltaic current output from the first optical sensor 214. Afterward, the signal processing unit 22 converts the amplified voltage signal into a digital signal by analog—digital conversion, enabling the optical power to be obtained. Each time the light becomes incident on a channel of the optical fibers of the MPO connector 52, the signal processing unit 22 can associate a channel number of the optical fiber whereon the light is incident and the optical power received by the first optical sensor 214 and temporarily store these.

The signal processing unit 22 identifies the polarity type of the multi-fiber connector fiber-optic patch cord 50 based on the second signal output from the second optical sensor 215. Described below is one example of a method of identifying the polarity type of the multi-fiber connector fiber-optic patch cord 50 taking as an example a situation of using the second optical sensor 215 illustrated in FIG. 4 and the 12-fiber MPO connector 53 illustrated in FIG. 6.

Figure 6:
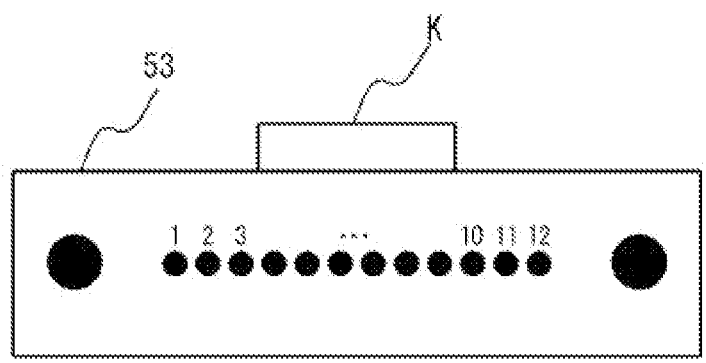
FIG. 6 A schematic view for describing a 12-fiber MPO connector.
Figure 7A:
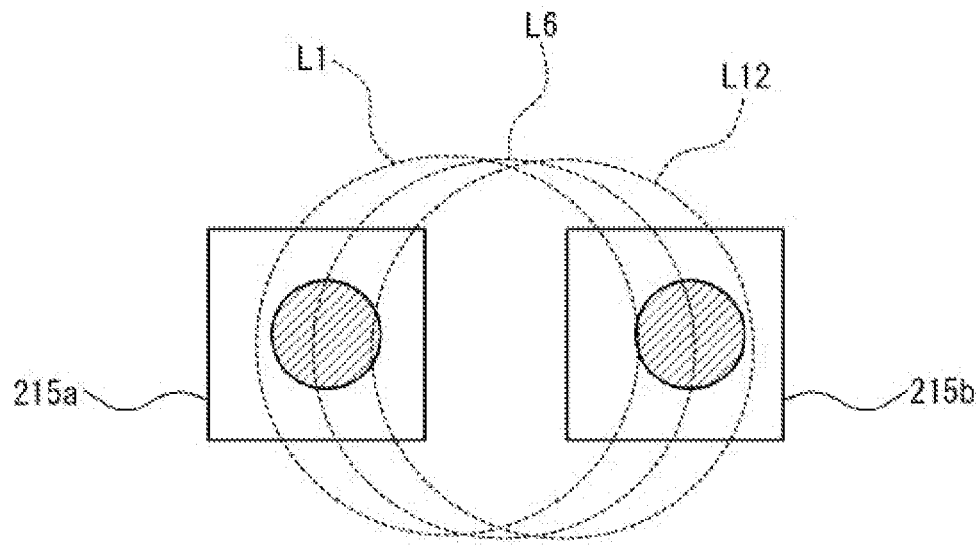
FIG. 7A A schematic view for describing spatial lights irradiated to a second optical sensor according to one or more embodiments.
Figure 7B:
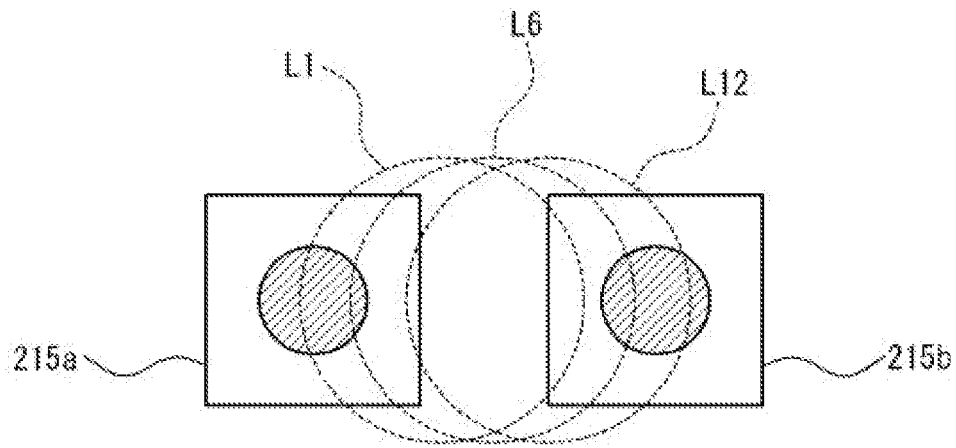
FIG. 7B A schematic view for describing spatial lights irradiated to the second optical sensor according to one or more embodiments.
Figure 8A:
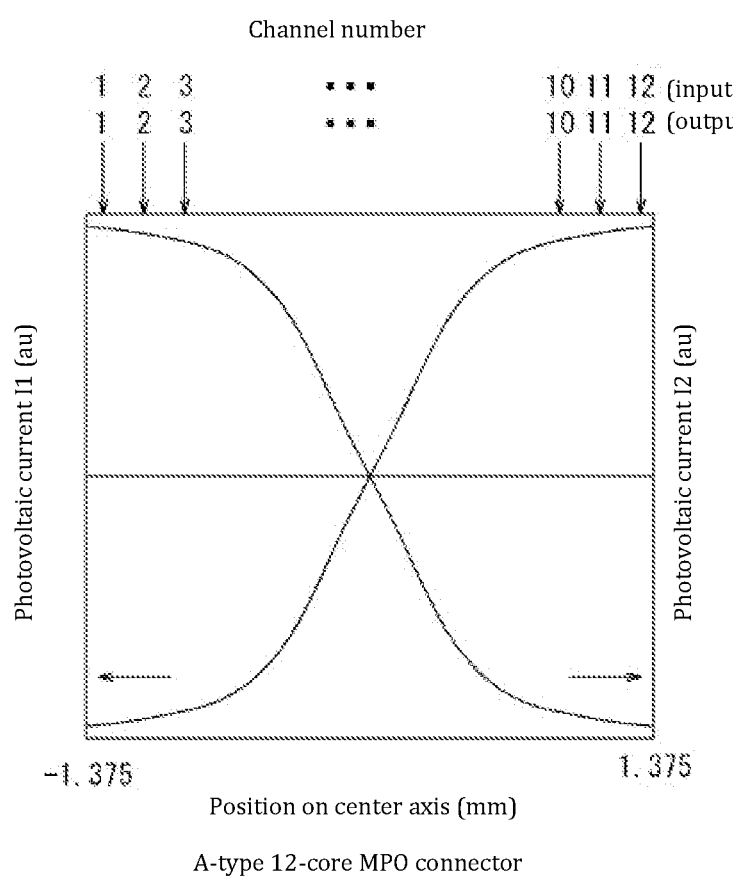
FIG. 8A A diagram for describing distributions of photovoltaic currents when A-type 12-fiber MPO connectors are used.
Figure 8B:
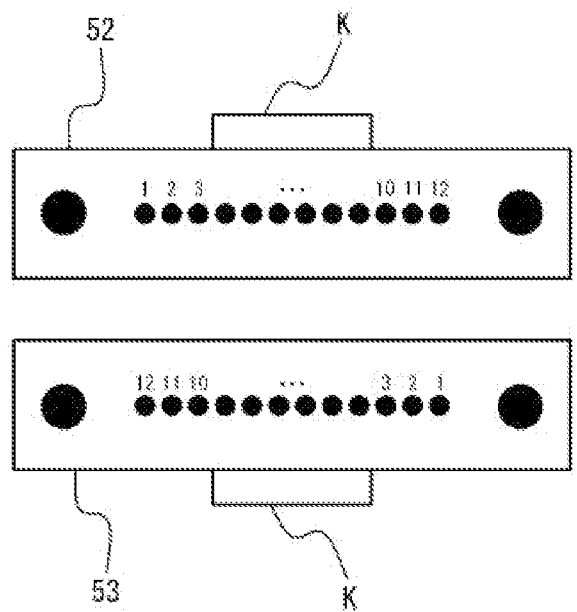
FIG. 8B A diagram for describing an A-type 12-fiber MPO connector that is connected to the light-source unit and an A-type 12-fiber MPO connector that is connected to the light-receiving unit.
Figure 9A:
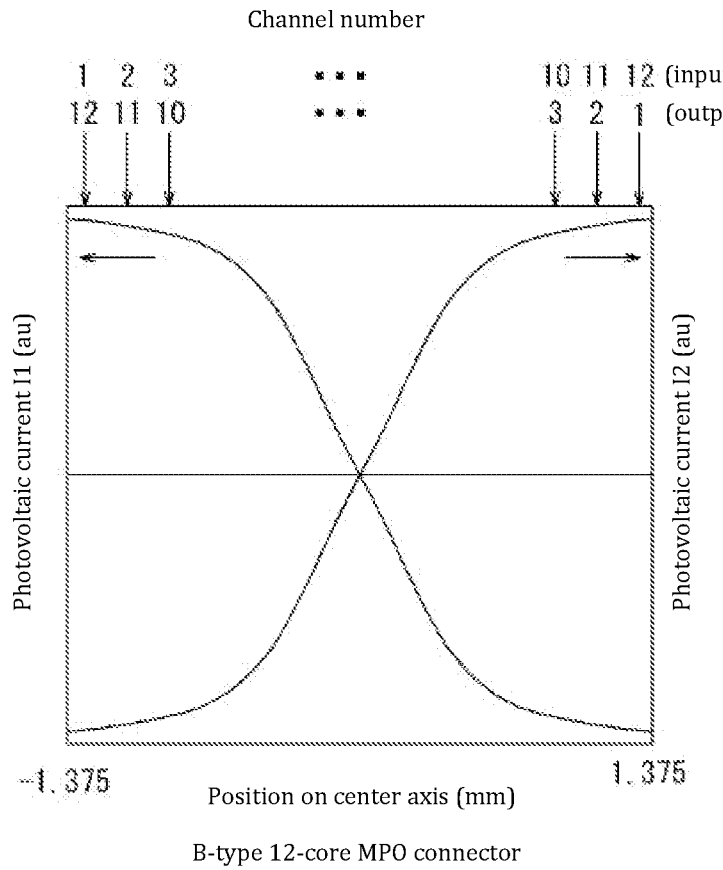
FIG. 9A A diagram for describing distributions of photovoltaic currents when B-type 12-fiber MPO connectors are used.
Figure 9B:
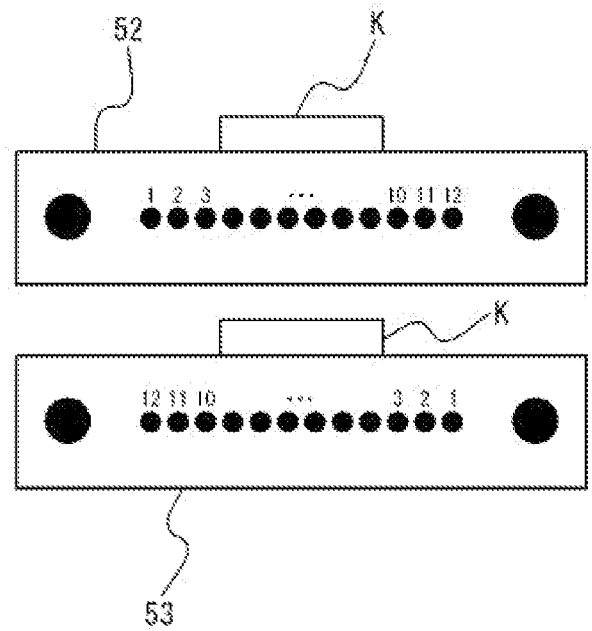
FIG. 9B A diagram for describing a B-type 12-fiber MPO connector that is connected to the light-source unit and a B-type 12-fiber MPO connector that is connected to the light-receiving unit.
Figure 10A:
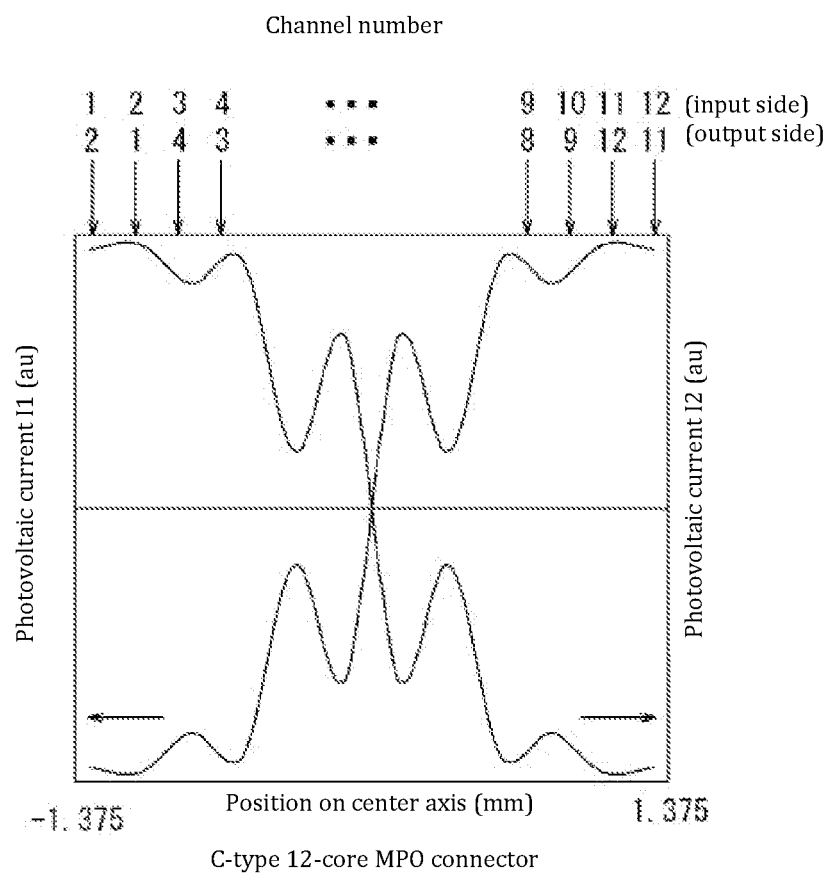
FIG. 10A A diagram for describing distributions of photovoltaic currents when C-type 12-fiber MPO connectors are used.
Figure 10B:
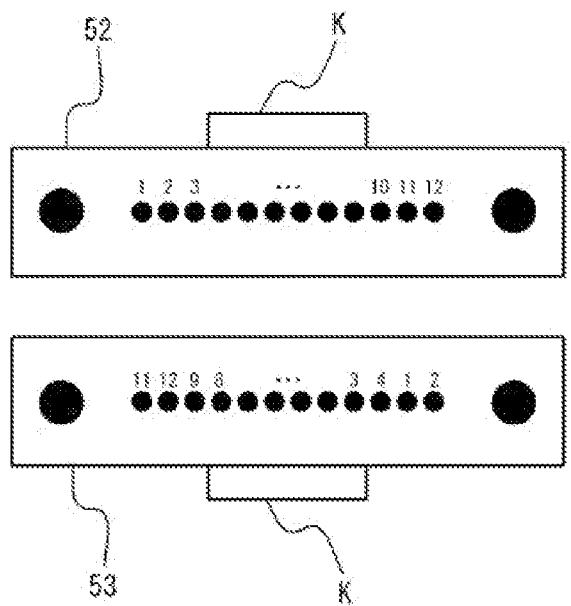
FIG. 10B A diagram for describing a C-type 12-fiber MPO connector that is connected to the light-source unit and a C-type 12-fiber MPO connector that is connected to the light-receiving unit.

FIG. 6 omits the receptacle 211 for a multi-fiber optical connector in illustrating the 12-fiber MPO connector 53 and also illustrates a key protrusion K that is fitted to the key groove provided by the receptacle 211 for a multi-fiber optical connector. Moreover, FIGS. 7A, B illustrate a state wherein the spatial light L1 from channel 1, a spatial light L6 from channel 6, and the spatial light L12 from channel 12 are each irradiated to the first photodiode 215a for channel identification and the second photodiode 215b for channel identification. Here, a light-receiving region (illustrated by diagonal hatching in the diagram) of the first photodiode 215a for channel identification and a light-receiving region (illustrated by diagonal hatching in the diagram) of the second photodiode 215b for channel identification are smaller than beam diameters of the spatial lights (for example, L1, L6, and L12). This enables the first photodiode 215a for channel identification and the second photodiode 215b for channel identification to receive a portion of the spatial light from each channel such that the photovoltaic current varies between each channel according to differences in quantity of light received. The above spatial lights spread in a Gaussian distribution; FIGS. 7A, B illustrate as circles regions wherein the energy density value of the light is $1/e^2$ of the peak value. Moreover, FIG. 7A illustrates spatial lights from multi-mode optical fibers (for example, numerical aperture [NA]=0.2), and FIG. 7B illustrates spatial lights from single-mode optical fibers (for example, numerical aperture [NA]=0.1). Moreover, FIG. 8A, FIG. 9A, and FIG. 10A illustrate on an x axis positions (mm) on the center axis of the light in the first photodiode 215a for channel identification and the second photodiode 215b for channel identification. Because the channel intervals (the channel pitch) of the optical fibers is 0.25 mm (=250 μm), a range of the positions on the center axis of the light is −1.375 mm to +1.375 mm but is not limited thereto. Moreover, a photovoltaic current I1 (au) according to the light received by the first photodiode 215a for channel identification is illustrated on a y axis (left side), and a photovoltaic current I2 (au) according to the light received by the second photodiode 215b for channel identification is illustrated on a y axis (right side). Moreover, FIG. 8B, FIG. 9B, and FIG. 10B illustrate the 12-fiber MPO connector 52 connected to the light-source unit 10 and the 12-fiber MPO connector 53 connected to the light-receiving unit 21 together with their channel numbers.

As illustrated in FIGS. 8A, B, A-type MPO connectors 52, 53 exhibit characteristics of the photovoltaic current I1 monotonically decreasing and the photovoltaic current I2 monotonically increasing as the channel numbers increase. Moreover, as illustrated in FIGS. 9A, B, B-type MPO connectors 52, 53 exhibit characteristics of the photovoltaic current I1 monotonically increasing and the photovoltaic current I2 monotonically decreasing as the channel numbers increase. Moreover, as illustrated in FIGS. 10A, B, C-type MPO connectors 52, 53 exhibit characteristics of the photovoltaic current I1 repeating [decreasing, increasing, decreasing, increasing, . . . ] in this order and the photovoltaic current I2 repeating [increasing, decreasing, increasing, decreasing, . . . ] in this order as the channel numbers increase.

Each time the light becomes incident on a channel of the optical fibers included in the MPO connector 52, the signal processing unit 22 repeats an operation of associating the channel number of the optical fiber whereon the light is incident on one hand and the above photovoltaic current I1 and photovoltaic current I2 on the other and temporarily storing these. For a 12-fiber MPO connector, the signal processing unit 22 repeats this operation twelve times. Next, after performing this operation for all channels of the optical fibers, the signal processing unit 22 respectively rearranges the photovoltaic currents I1 and the photovoltaic currents I2 according to size (in ascending order or descending order). Finally, the signal processing unit 22 compares the photovoltaic currents I1 and the photovoltaic currents I2 rearranged according to size and, for example, the characteristics of each type of MPO connector illustrated in FIG. 8A, FIG. 9A, and FIG. 10A to identify the polarity type of the multi-fiber connector fiber-optic patch cord 50.

The signal processing unit 22 outputs the optical power of each channel and the polarity type of the multi-fiber connector fiber-optic patch cord 50 obtained by the above method to the display unit 23.

The signal processing unit 22 can include a processing device such as a CPU (central processing unit). Moreover, the signal processing unit 22 can include various memories, such as a ROM (read-only memory) that can store a program and data necessary for the processing device to operate, a flash memory (flash memory), or a DRAM (dynamic random-access memory) that can temporarily store data. This enables the signal processing unit 22 to execute the program.

The display unit 23 is a display device that displays an image representing various information of the measurement unit 20. The display unit 23 can include a display device such as a liquid-crystal display. The display unit 23 displays the optical power of each channel calculated by the signal processing unit 22 and the polarity type of the multi-fiber connector fiber-optic patch cord 50 identified by the signal processing unit 22. In this manner, the multi-fiber connector fiber-optic measurement device 1 can present to a user thereof the polarity type and the optical power of each channel of the multi-fiber connector fiber-optic patch cord 50. As the user of the multi-fiber connector fiber-optic measurement device 1, a worker laying the multi-fiber connector fiber-optic patch cord 50 in a facility such as a data center can be mentioned. The display unit 23 may be an external display device external to the measurement unit 20.

To describe the above in different terms, the light from the multi-fiber connector fiber-optic patch cord 50 becomes incident on the beam splitter 213. Among the light incident on the beam splitter 213, the transmitted light becomes incident on the first optical sensor 214. Meanwhile, among the light incident on the beam splitter 213, the reflected light becomes incident on the second optical sensor 215. Then, the signal processing unit 22 calculates the optical power based on the first signal from the first optical sensor 214 and identifies the polarity type based on the second signal from the second optical sensor 215. The first optical sensor 214 may receive the reflected light among the light split by the beam splitter 213, and the second optical sensor 215 may receive the transmitted light among the light split by the beam splitter 213.

Figure 11:
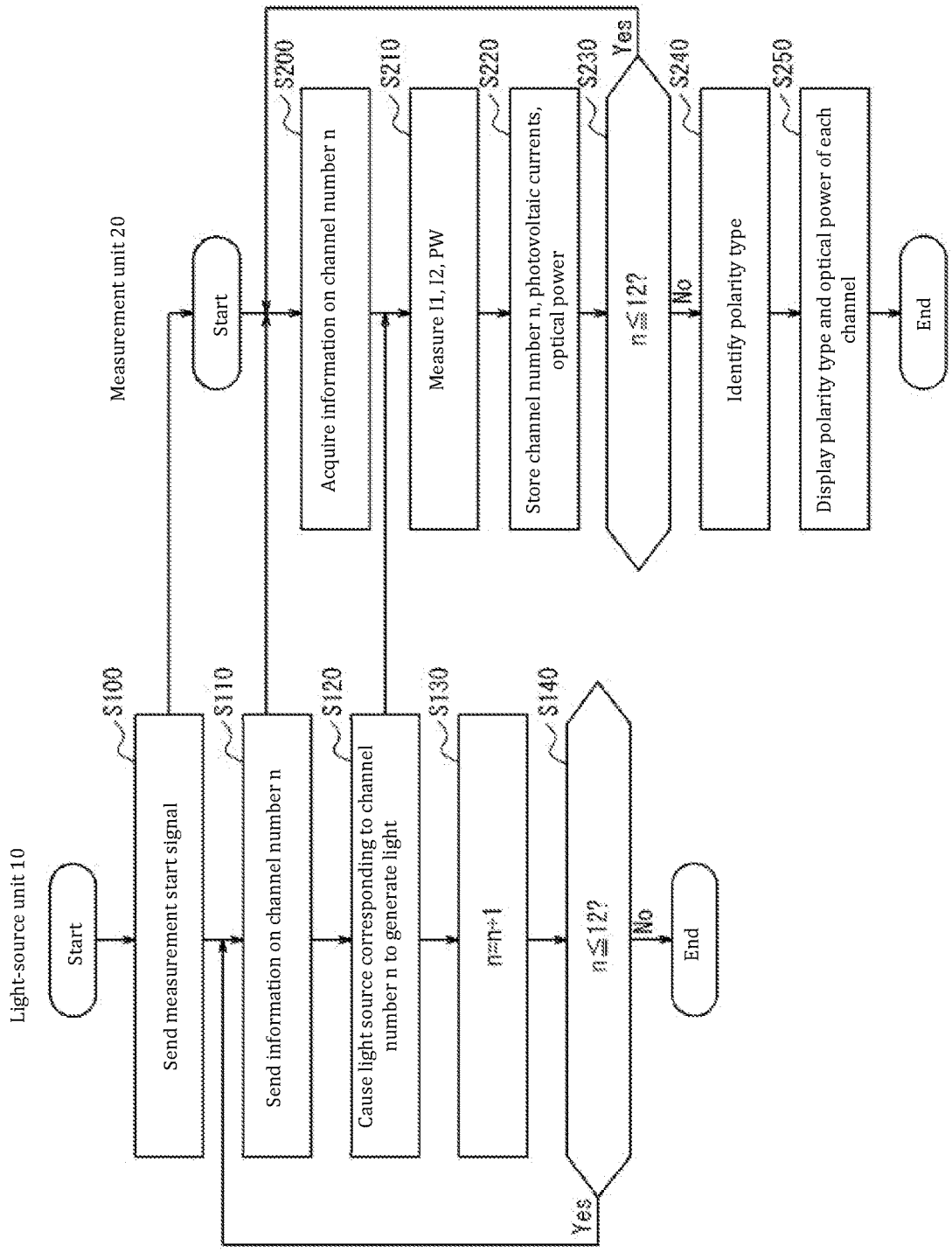
FIG. 11 A flowchart for describing a processing procedure of the multi-fiber connector fiber-optic measurement device according to one or more embodiments.

Next, overall operations of the multi-fiber connector fiber-optic measurement device 1 of identifying the polarity type and measuring the optical power of each channel of the multi-fiber connector fiber-optic patch cord 50 are described. FIG. 11 is a flowchart illustrating processing procedures of the light-source unit 10 and the measurement unit 20 in the multi-fiber connector fiber-optic measurement device 1 according to one or more embodiments. Described below is an example where a fiber count of the multi-fiber connector fiber-optic patch cord 50 is twelve.

Polarity-type identification and optical-power measurement of the multi-fiber connector fiber-optic patch cord 50 are started in a state of the multi-fiber connector fiber-optic patch cord 50 being connected between the light-source unit 10 and the measurement unit 20.

First, operations of the light-source unit 10 are described with reference to FIG. 11. Here, an example is described where, as illustrated in FIG. 3A, the light-source unit 10 is provided with the plurality of light sources 12.

First, at step S100, the control unit 11 included in the light-source unit 10 sends a measurement start signal representing starting measurement to the measurement unit 20. A method and format of the control unit 11 sending the measurement start signal to the measurement unit 20 is not particularly limited. For example, the control unit 11 may use a level signal representing starting measurement to send the measurement start signal to the measurement unit.

Next, at step S110, the control unit 11 sends information on a channel number n of the optical fiber whereon the light is incident to the measurement unit 20. A method and format of the control unit 11 sending the information on the channel number n to the measurement unit 20 is not particularly limited. For example, the control unit 11 may send the information on the channel number n to the measurement unit 20 by using a pulse signal or a data signal representing the channel number n.

Next, at step S120, the control unit 11 causes the light source 12 corresponding to the channel number of the optical fiber whereon the light is incident to generate light. This makes the light generated by the light source 12 corresponding to the channel number n incident on the corresponding fiber-optic fanout cord 13. The light incident on the fiber-optic fanout cord 13 is emitted to a specific channel among the plurality of optical fibers 51 included in the multi-fiber connector fiber-optic patch cord 50 disposed with the MPO connector 52 connected to the connector adapter 14. Then, the light emitted to the specific channel is transmitted to the MPO connector 53 connected to the measurement unit 20.

Next, at step S130, the control unit 11 increments the channel number n of the optical fiber whereon the light is incident.

Next, at step S140, the control unit 11 determines whether the channel number n updated at step S130 is no greater than the fiber count of the multi-fiber connector fiber-optic patch cord 50. Here, because the fiber count of the multi-fiber connector fiber-optic patch cord 50 is twelve, the control unit 11 determines whether the current channel number n is no greater than 12.

At step S140, if the channel number n is no greater than the fiber count of the multi-fiber connector fiber-optic patch cord 50 (step S140: YES), the flow returns to the process of step S110. Meanwhile, at step S140, if the channel number n is not no greater than the fiber count of the multi-fiber connector fiber-optic patch cord 50 (step S140: NO), the control unit 11 ends light incidence.

By the above processes, the light-source unit 10 sequentially makes the lights from the light sources 12 incident on each channel of the optical fibers included in the MPO connector 52 connected to the connector adapter 14. By this, the lights from the light sources 12 are sequentially made incident on each channel of the optical fibers included in the MPO connector 52 in a preestablished order (in FIG. 11, an order of channel 1, channel 2, . . . , channel 12).

If, as illustrated in FIG. 3B, the light-source unit 10 is provided with one light source 12, at step S120, instead of generating light by the light source 12 corresponding to the channel number n, the control unit 11 changes the optical path of the light generated by the light source 12 by the optical switch 15. This enables the light-source unit 10 to operate similarly to when a plurality of light sources 12 is provided even when provided with one light source 12.

Next, operations of the measurement unit 20 are described with reference to FIG. 11.

When the measurement unit 20 receives the measurement start signal sent at the process of step S100 by the light-source unit 10, first, at step S200, the signal processing unit 22 acquires the information on the channel number n sent by the light-source unit 10 by the process of step S110.

Next, at step S210, the signal processing unit 22 calculates an optical power PW of the light emitted from a specific channel of the optical fibers 51 based on the first signal output from the first optical sensor 214. Moreover, the signal processing unit 22 calculates the photovoltaic current I1 and the photovoltaic current I2 based on the second signal output from the second optical sensor 215.

Next, at step S220, the signal processing unit 22 associates the photovoltaic current I1, the photovoltaic current I2, and the optical power PW calculated at step S210 on one hand and the channel number n received at step S200 on the other and temporarily stores these.

Next, at step S230, the signal processing unit 22 determines whether the channel number n received at step S200 is no greater than the fiber count of the multi-fiber connector fiber-optic patch cord 50. Here, because the fiber count of the multi-fiber connector fiber-optic patch cord 50 is twelve, the signal processing unit 22 determines whether the channel number n received at step S200 is no greater than 12.

At step S230, if the channel number n received at step S200 is no greater than the fiber count (step S230: YES), the flow returns to the process of step S200. Meanwhile, at step S230, if the channel number n received at step S200 is not no greater than the fiber count (step S230: NO), the flow proceeds to step S240.

If the flow proceeds to step S240, at step S240, the signal processing unit 22 identifies the polarity type of the multi-fiber connector fiber-optic patch cord 50 by the method described above.

Next, at step S250, the signal processing unit 22 outputs the polarity type of the multi-fiber connector fiber-optic patch cord 50 identified at step S240 and the optical powers PW of each channel to the display unit 23. Afterward, the signal processing unit 22 ends the present flowchart.

It is also possible to impart in advance to the measurement unit 20 information to switch a timing of the light-source unit 10 generating light at predetermined time intervals—for example, about every 0.3 seconds. Here, the light-source unit 10 sends only the measurement start signal to the measurement unit 20. That is, in the flowchart illustrated in FIG. 11, the processes of steps S110 to S140 can be omitted.

According to one or more embodiments, a polarity type of a multi-fiber connector fiber-optic patch cord can be identified regardless of a fiber count of the multi-fiber connector fiber-optic patch cord. Moreover, the multi-fiber connector fiber-optic measurement device 1 provides no component that would cause light loss, such as the conventional fiber-optic fanout cord 412 and optical switch 413, between the multi-fiber connector fiber-optic patch cord 50 on one hand and the first optical sensor 214 and the second optical sensor 215 on the other. In other words, the first optical sensor 214 and the second optical sensor 215 directly receive the spatial lights from the optical fibers. As such, according to one or more embodiments, decreased measurement precision of optical power can be suppressed. Moreover, according to one or more embodiments, unlike a situation of identifying channels and measuring optical power using an optical sensor including a single photodiode having a plurality of light-receiving regions (a so-called "divided photodiode"), there is no fear of light sensitivity decreasing at a boundary of a light-receiving region of an optical sensor for measuring optical power. Moreover, according to one or more embodiments, because there is no need to use light-source units and optical sensors of a number corresponding to a fiber count of a multi-fiber connector fiber-optic patch cord, costs can be reduced.

The present invention is described above based on the drawings and embodiments, but a person skilled in the art can make many variations or changes based on the present disclosure. Such variations and changes are included within the scope of the present invention. For example, functions and the like included at each step and the like can be rearranged so no logical contradictions are generated, and a plurality of steps and the like can be combined into one or divided.

Described below is a variation where the measurement target is a 12-fiber×two-row 24-fiber multi-fiber connector fiber-optic patch cord.

Figure 12:
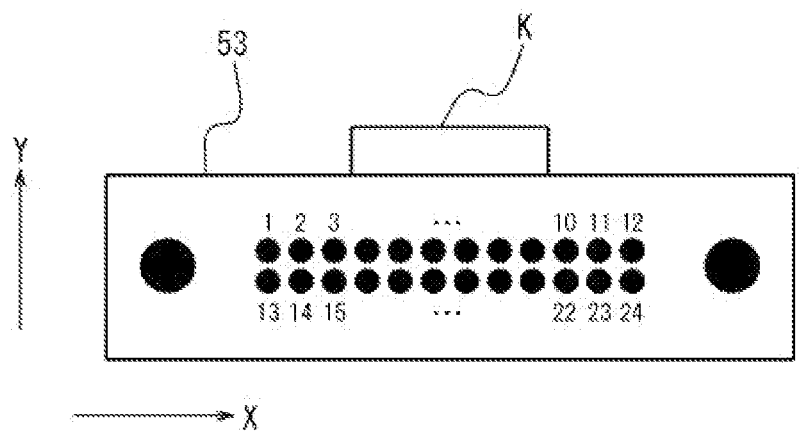
FIG. 12 A schematic view for describing a 24-fiber MPO connector.
Figure 13A:
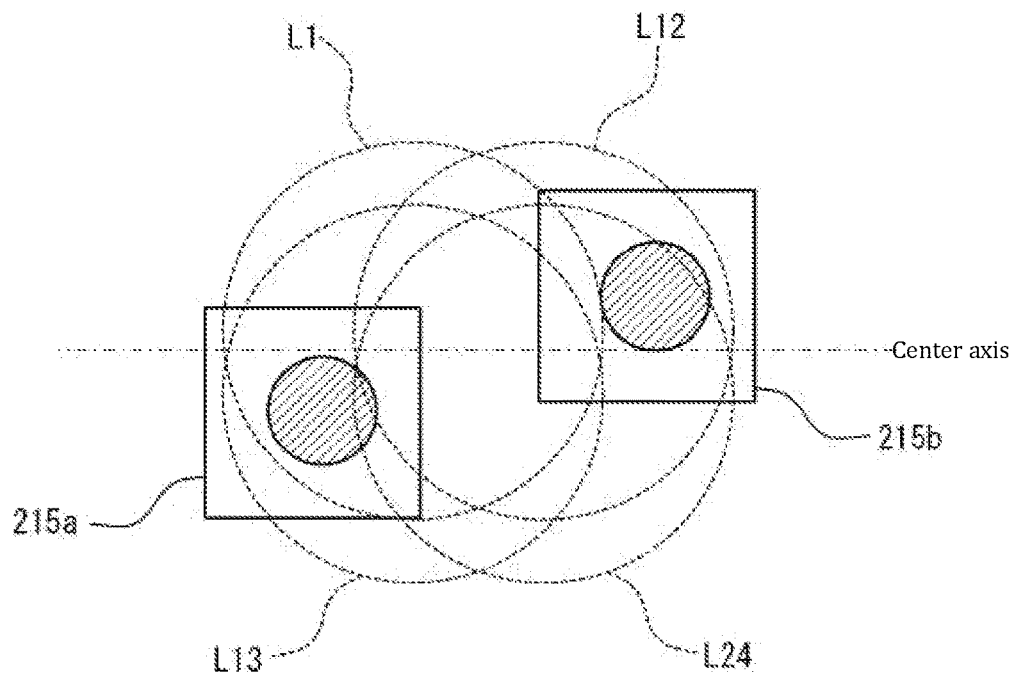
FIG. 13A A schematic view for describing spatial lights irradiated to a second optical sensor of a variation.

FIG. 12 illustrates a 12-fiber×two-row 24-fiber MPO connector. Channel intervals (a channel pitch) can be made to be, for example, 0.25 mm. FIG. 13A illustrates a state wherein a spatial light L1 from channel 1, a spatial light L12 from channel 12, a spatial light L13 from channel 13, and a spatial light L24 from channel 24 of the 24-fiber MPO connector are each irradiated to the first photodiode 215a for channel identification and a second photodiode 215b for channel identification. That is, in this variation, the first photodiode 215a for channel identification and the second photodiode 215b for channel identification are positioned on a light-receiving face by being shifted a predetermined distance in mutually opposing directions along a direction perpendicular to a center axis of the light. This creates a difference in photovoltaic-current sizes between the spatial light L1 from channel 1 and the spatial light L13 from channel 13. As such, channel 1 and channel 13 can be precisely identified. For similar reasons, channel 2 and channel 14, . . . , and channel 12 and channel 24 can each be precisely identified. The "center axis of the light" can be found in advance by, for example, an optical simulation. For example, a perpendicular bisector of a line segment whose end points are a center of a circle (illustrated by a dashed line in the diagram) illustrating a region wherein an energy density value of the spatial light L1 from channel 1 is $1/e^2$ of a peak value and a center of a circle (illustrated by a dashed line in the diagram) illustrating a region wherein an energy density value of the spatial light L13 from channel 13 is $1/e^2$ of a peak value can be defined as the "center axis of the light." The "predetermined distance" varies according to the channel intervals (the channel pitch) of the optical fibers but is a distance within a range of, for example, several millimeters to several ten millimeters.

Figure 13B:
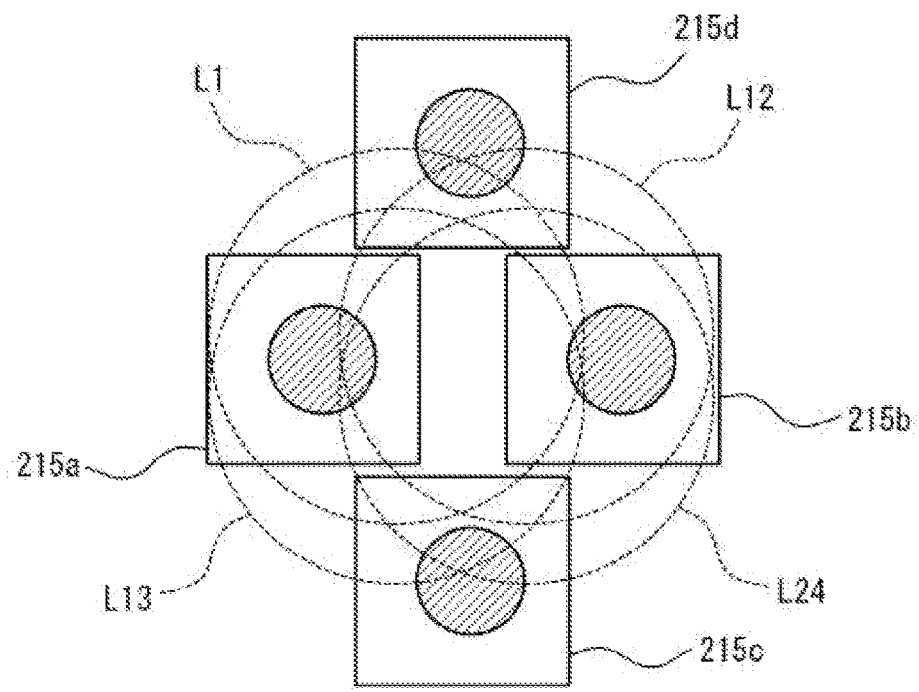
FIG. 13B A schematic view for describing spatial lights irradiated to a second optical sensor of a variation.

Furthermore, in the variation illustrated in FIG. 13B, the second optical sensor 215 is provided with a first photodiode 215a for channel identification, a second photodiode 215b for channel identification, a third photodiode 215c for channel identification, and a fourth photodiode 215d for channel identification. The first photodiode 215a for channel identification and the second photodiode 215b for channel identification are positioned on the light-receiving face at positions separated by a predetermined distance along the center axis of the light (for example, an x axis). By this, channels 1 to 12 are identified from channels 13 to 23. Moreover, the third photodiode 215c for channel identification and the fourth photodiode 215d for channel identification are positioned separated along a direction perpendicular to the center axis (for example, a y axis). By this, channel 1 and channel 13, channel 2 and channel 14, . . . , and channel 12 and channel 24 are precisely identified.

A fiber count of the multi-fiber connector fiber-optic patch cord is not limited to twelve fibers or twenty-four fibers, and a polarity type can be identified and optical power can be measured similarly even at forty-eight fibers of twelve fibers×four rows or thirty-two fibers of sixteen fibers×two rows.

INDUSTRIAL APPLICABILITY

According to one or more embodiments of the present invention, decreased measurement precision of optical power of a multi-fiber connector fiber-optic patch cord can be suppressed, and a polarity type of a multi-fiber connector fiber-optic patch cord can be identified.

REFERENCE SIGNS LIST

1 Multi-fiber connector fiber-optic measurement device
10 Light-source unit
11 Control unit
12 Light source
13 Fiber-optic fanout cord
14 Connector adapter
15 Optical switch
20 Measurement unit
21 Light-receiving unit
211 Receptacle for multi-fiber optical connector
212 Condensing lens
213 Beam splitter
214 First optical sensor
215 Second optical sensor
215a First photodiode for channel identification
215b Second photodiode for channel identification
215c Third photodiode for channel identification
215d Fourth photodiode for channel identification
22 Signal processing unit
23 Display unit 50 Multi-fiber connector fiber-optic patch cord
51 Optical fiber
52 MPO connector (multi-fiber optical connector)
53 MPO connector (multi-fiber optical connector)

What is claimed is:

1. A multi-fiber connector fiber-optic measurement device that identifies a polarity type and measures an optical power of a multi-fiber connector fiber-optic patch cord, comprising:
   a beam splitter that splits light from the multi-fiber connector fiber-optic patch cord into a plurality of lights;
   a first optical sensor that receives one of the lights split by the beam splitter and outputs a first signal according to the received light;
   a second optical sensor that receives another of the lights split by the beam splitter and outputs a second signal according to the received light; and
   a signal processor that calculates the optical power based on the first signal and identifies the polarity type based on the second signal, wherein
   the second optical sensor comprises a first photodiode for channel identification and a second photodiode for channel identification, and
   the first photodiode and the second photodiode are positioned away from each other on a light-receiving face of the lights.

2. The multi-fiber connector fiber-optic measurement device according to claim 1, wherein the first photodiode and the second photodiode are shifted in mutually opposing directions along a direction perpendicular to a center axis of the lights on the light-receiving face.

3. The multi-fiber connector fiber-optic measurement device according to claim 1, wherein the second optical sensor further comprises a third photodiode for channel identification and a fourth photodiode for channel identification,
   the first photodiode and the second photodiode are positioned away from each other along a center axis of the light on the light-receiving face, and
   the third photodiode and the fourth photodiode are positioned away from each other along a direction perpendicular to the center axis on the light-receiving face.

4. The multi-fiber connector fiber-optic measurement device according to claim 1, wherein the beam splitter is a non-polarizing beam splitter.

5. The multi-fiber connector fiber-optic measurement device according to claim 1, further comprising: a condensing lens between the multi-fiber connector fiber-optic patch cord and the beam splitter, that condenses all light from the multi-fiber connector fiber-optic patch cord to the first optical sensor.

6. The multi-fiber connector fiber-optic measurement device according to claim 1, wherein the multi-fiber connector fiber-optic measurement device is a receptacle for a multi-fiber optical connector connected to the multi-fiber connector fiber-optic patch cord via a multi-fiber optical connector, and
   the receptacle for a multi-fiber optical connector has an opening that does not block light emitted from a ferrule end face of optical fibers in the multi-fiber optical connector.

7. The multi-fiber connector fiber-optic measurement device of claim 6, wherein the opening houses a positioning pin of the multi-fiber optical connector.

8. A multi-fiber connector fiber-optic measurement method of identifying a polarity type and measuring an optical power of a multi-fiber connector fiber-optic patch cord, comprising:
   splitting light from a multi-fiber connector fiber-optic patch cord into a plurality of lights;
   receiving, with a first optical sensor, one of the split lights and outputting a first signal according to the received light;
   receiving, with a second optical sensor, another of the split lights and outputting a second signal according to the received light; and
   calculating the optical power based on the first signal and identifying the polarity type based on the second signal, wherein
   the second optical sensor comprises a first photodiode for channel identification and a second photodiode for channel identification, and
   the first photodiode and the second photodiode are positioned away from each other on a light-receiving face of the lights.

* * * * *